United States Patent [19]
Seki et al.

[11] Patent Number: 5,270,918
[45] Date of Patent: Dec. 14, 1993

[54] AUTOMATIC PROGRAMMING METHOD

[75] Inventors: Masaki Seki, Suginami; Takashi Takegahara, Hachioji; Toru Matsunaka, Yanai, all of Japan

[73] Assignee: Fanuc Ltd., Minamitsuru, Japan

[21] Appl. No.: 721,551

[22] PCT Filed: Nov. 1, 1990

[86] PCT No.: PCT/JP90/01410
§ 371 Date: Jul. 12, 1991
§ 102(e) Date: Jul. 12, 1991

[87] PCT Pub. No.: WO91/07708
PCT Pub. Date: May 30, 1991

[30] Foreign Application Priority Data

Nov. 17, 1989 [JP] Japan .................. 1-297589

[51] Int. Cl.$^5$ ............................ G05B 19/403
[52] U.S. Cl. .................. 364/191; 318/568.1; 364/474.23
[58] Field of Search ................ 364/191–193, 364/474.11, 474.22–474.27, 474.14; 318/568.1; 82/118–120, 129, 159

[56] References Cited

U.S. PATENT DOCUMENTS

| | | | |
|---|---|---|---|
| 3,439,346 | 4/1969 | McGee | 364/474.23 X |
| 3,739,157 | 6/1973 | Bobrowicz et al. | 364/474.11 X |
| 4,550,375 | 10/1985 | Sato et al. | 364/474.14 X |
| 4,587,608 | 5/1986 | Kishi et al. | 364/191 |
| 4,797,811 | 1/1989 | Kiyokawa et al. | 364/474.23 X |
| 4,890,234 | 12/1989 | Tanaka | 364/474.23 |
| 5,057,755 | 10/1991 | Naka | 364/474.23 X |

FOREIGN PATENT DOCUMENTS

| | | |
|---|---|---|
| 0213531 | 3/1987 | European Pat. Off. |
| 59-172008 | 9/1984 | Japan. |
| 63-12005 | 1/1988 | Japan. |
| 63-229504 | 9/1988 | Japan. |
| 63-317807 | 12/1988 | Japan. |

OTHER PUBLICATIONS

*Patent Abstracts of Japan*, vol. 11, No. 386 (P-647)(2833) Dec. 17, 1987 and JP-A-62 152005 (Fanuc Ltd.) Jul. 1987.

Primary Examiner—Joseph Ruggiero
Attorney, Agent, or Firm—Staas & Halsey

[57] ABSTRACT

An automatic programming method capable of creating NC data for combined machining effectively and accurately. Each time a processor of an automatic programming apparatus reads one block of a past program for combined machining stored in a random access memory, the processor selects one of three automatic programming languages, turning, milling and general purpose machining, in which the part program sentence of the block thus read is written. The processor translates the program sentence by means of a first, second, or third interpreter selected based on the selected programming language, and causes the resultant NC data to be stored in a memory, whereby NC data for combined machining is automatically and continuously created.

8 Claims, 2 Drawing Sheets

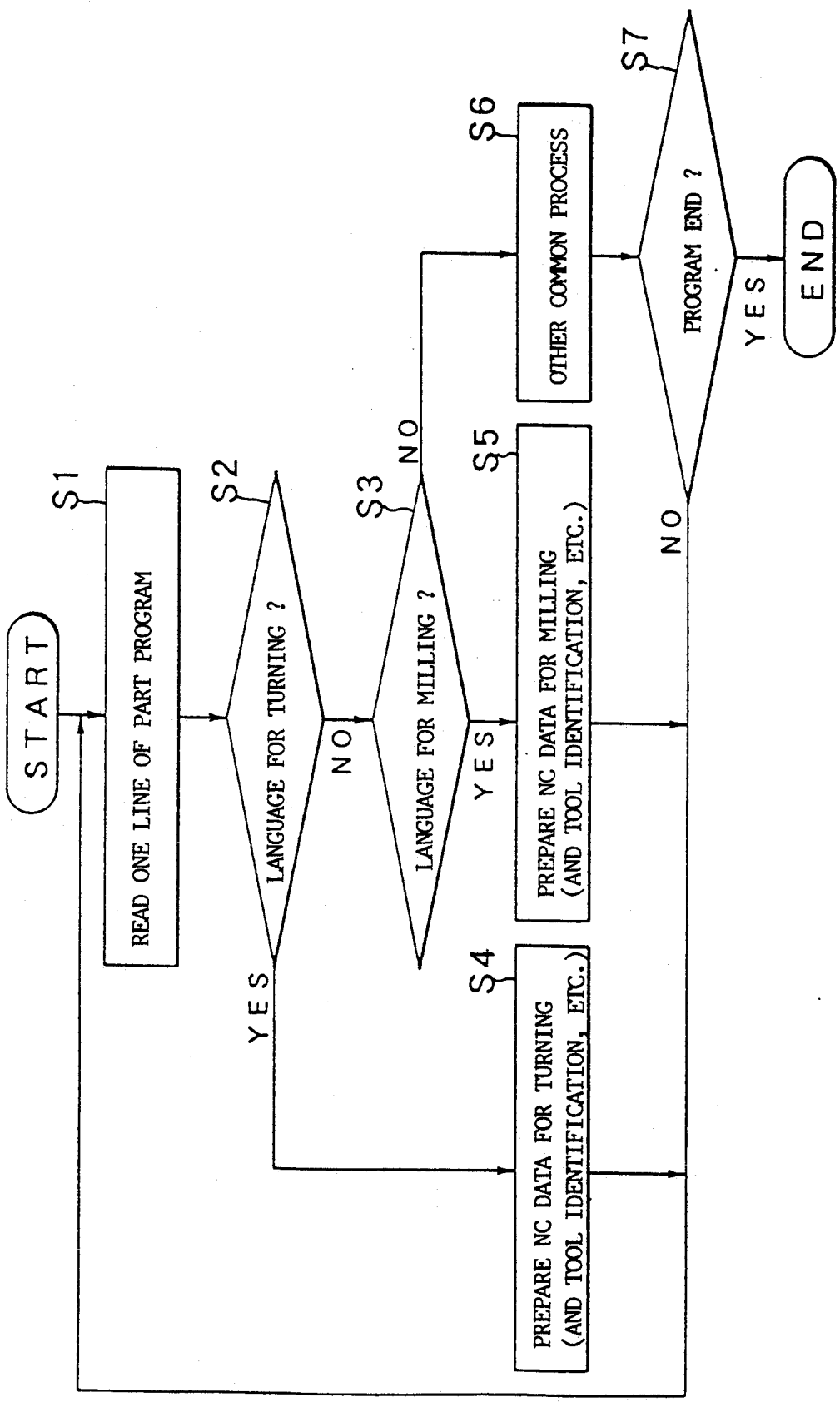

AUTOMATIC PROGRAMMING METHOD

TECHNICAL FIELD

The present invention relates to an automatic programming method for effectively and accurately creating NC data for combined machining.

BACKGROUND ART

It is known to create NC data (NC program) for operating a combined machining apparatus adapted to perform plural kinds of machining, by the use of automatic programming apparatuses. Since a conventional programming apparatus is a single purpose device having a function of creating NC data for one particular machining alone, plural kinds of programming apparatuses are employed for creating NC data for combined machining.

For example, in the case of creating NC data for combined machining for carrying out turning and milling together, part programs respectively relating to turning and milling are created beforehand. Then, NC data for turning is created based on the part program for turning by the use of a programming apparatus, whereas NC data for milling is created based on the part program for milling by means of another programming apparatus. Further, NC data for turning and milling are so edited as to create NC data for the combined machining.

According to the above conventional method, it requires a great deal of time and labor to create the NC data for combined machining, and an error is likely to occur in an editing operation of NC data such that input sequence of NC data is mistaken.

DISCLOSURE OF THE INVENTION

The object of the present invention is to provide an automatic programming method for creating NC data for combined machining effectively and accurately.

In order to achieve the above object, the present invention comprises the steps of: (a) creating a part program for combined machining which includes first and second part programs respectively relating to first and second kinds of machining; (b) providing a group of translating means which includes first and second translating means for translating the first and second part programs into first and second NC data respectively relating to the first and second kinds of machining; (c) reading the part program for combined machining one block by one block, and automatically determining a kind of the part program of the block thus read; and (d) automatically translating the part program of the read block in step (c) by use of that translating means whose kind corresponds to the result the determination in step (c), whereby NC data for combined machining is automatically and continuously created on the basis of the part program for combined machining.

As explained above, according to the present invention, a part program for combined machining, including the first and second part programs respectively relating to the first and second kinds of machining, is read one block by one block, a kind of the read part program is automatically determined, and automatic translation to NC data is effected by the use of that translating means whose kind corresponds to the kind of the read part program, among the group of translating means including the first and second translating means for translating the first and second part programs into first and second NC data respectively relating to the first and second kinds of machining. Thus, NC data for the combined machining can be automatically and continuously created on the basis of the part program for the combined machining. Accordingly, it is unnecessary to create various part programs, which cooperate to form the part program for the combined machining, separately for kinds of these part programs. This permits efficient creation of the part programs. Moreover, an operation of editing various NC data, obtained by translating the various part programs into NC data for the combined machining, is unnecessary, so that errors attributable to the editing operation never occur. As a result, it is possible to positively and rapidly create the NC data for the combined machining for conducting various types of machining in a desired sequence.

BRIEF DESCRIPTION OF THE DRAWINGS

FIG. 2 is a flowchart showing an NC data creating process executed by the programming apparatus shown in FIG. 1.

BEST MODE OF CARRYING OUT THE INVENTION

Figure 1:
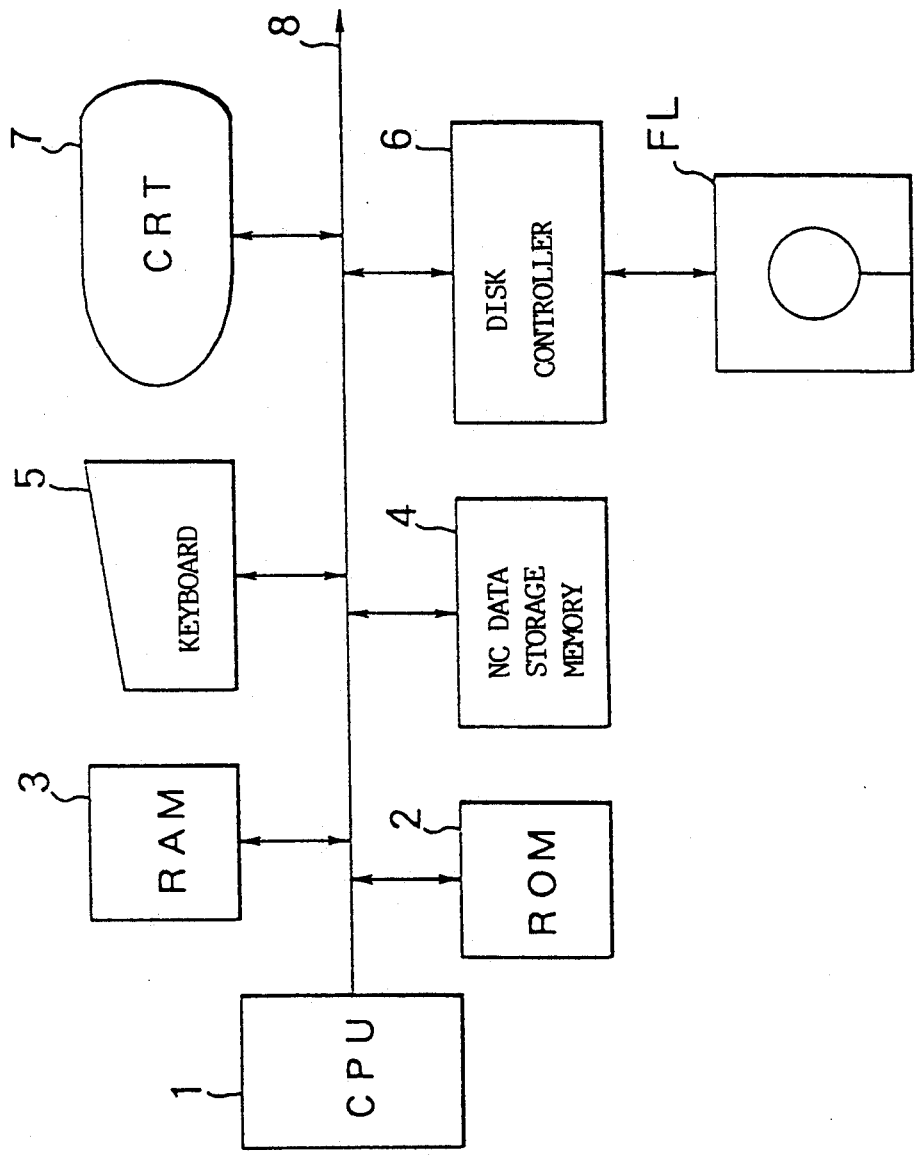
FIG. 1 is a block diagram showing essential parts of an automatic programming apparatus for embodying an automatic programming method according to an embodiment of the present invention.

A method of an embodiment of the present invention is intended to create an NC data for a combined machining, which is a combination of turning and milling. As shown in FIG. 1, an automatic programming apparatus for embodying this method comprises a processor (CPU) 1, a read-only memory (ROM) 2, a random-access memory (RAM) 3, an NC data storage memory 4, a keyboard 5, a disk controller 6, and a graphic display unit (CRT) 7. These elements 2 to 7 are connected to the CPU 1 via buses 8.

In the automatic programming apparatus of FIG. 1, under the control of the CPU 1, which operates in accordance with a control program stored in the ROM 2, a system program and part programs are transferred from a floppy disk loaded in the disk controller 6 to the RAM 3, to be stored therein. Then, NC data translated or compiled from the part programs by the CPU 1 are stored in the memory 4. During the computational operations of the CPU 1, the RAM 3 is utilized for temporary storage of operation results.

More specifically, a part program for combined machining, which is inputted to the unit of FIG. 1 for creation of an NC data for combined machining, includes first to third programs for turning, milling, and general purpose machining, which are respectively created by an operator with the use of first to third automatic programming languages (FAPT TURN, FAPT MILL, FAPT) for turning, milling, and general purpose machining. The first to the third part programs are arranged in the part program for combined machining in order of machining sequence in the combined machining. The part program for combined machining is stored in the floppy disk FL. In addition to the part program for combined machining, stored in the floppy disk FL for use as a system disk, are various system programs and first to third interpreters (interpretive programs), which respectively serve as translating means for translating the first to third part programs for turning, milling and general purpose machining into first to third NC data for turning, milling and general purpose machining, respectively.

Referring to FIG. 2, operation of the automatic programming apparatus shown in FIG. 1 will be explained.

After the system program, the part program for combined machining, etc. are transferred to and stored in the RAM 3 from the floppy disk FL under the control of the CPU 1, an NC data creating process shown in FIG. 2 is executed by the CPU 1.

At first, the CPU 1 reads the initial block of the part program for combined machining stored in the RAM 3 (step S1), and determines whether or not the part program sentence in the initial block is written in the first automatic programming language for turning, to thereby determine whether or not the initial block relates to a part program for turning (step S2). If the determination result is affirmative, the CPU 1 translates the program of the initial block into a first NC data for turning by means of the first interpreter (step S4). More specifically, creation of NC data for turning, identification of a tool for turning, etc. are executed in accordance with numerical data, a tool management number, etc. respectively described in the part program of the initial block. Then, the execution results are stored in the memory 4.

On the other hand, if the determination result at step S2 is negative, the CPU determines whether or not the program sentence of the initial block is written in the second automatic programming language for milling, to thereby determine whether or not the initial block relates to a part program for milling (step S3). If the determination result is affirmative, the CPU translates the program of the initial block into a second NC data for milling by means of the second interpreter (step S5). More specifically, creation of NC data for milling, identification of a tool for milling, etc. are executed in accordance with numerical data, a tool management number, etc. respectively described in the program of the initial block, and then the execution results are stored in the memory 4.

When both of the determination results in steps S2 and S3 are negative, and therefore, it is determined that the program sentence of the initial block is written in the third programming language for general purpose machining other than the first and second programming languages for turning and milling, the CPU 1 translates the part program by means of the third interpreter, and executes processes associated with commands written in this part program. Then, the CPU causes the execution results to be stored in the memory 4 (step S6). Next, a determination is made as to whether or not the initial block indicates program end (step S7). Here, the determination result in step S7 is negative, and hence the CPU 1 reads the second block of the part program for combined machining (step S1), and further sequentially executes corresponding ones of steps S2 to S7 with respect to the second block.

Thereafter, each time a new block of the part program for combined machining is read, corresponding ones of steps S2 to S7 are executed. As a consequence, each of the program sentences of the respective blocks is translated in succession by means of that interpreter whose kind is determined in dependence on the kind of the program sentence, whereby the part program for combined machining is automatically and continuously created, to be stored in the memory 4. When a program statement including a command "FINI," which is contained in a part program for general purpose machining and which indicates the program end, is thereafter executed, and hence it is determined that the whole of the part program for combined machining has been executed, the CPU 1 finishes the NC data creating process shown in FIG. 2.

The present invention is not limited to the foregoing embodiment, but various modifications thereof may be made.

For example, in the above embodiment, part program sentences for turning, milling and general purpose machining are written in different programming languages, however, the part program sentences for turning, milling and general purpose machining may be written in a programming language of the same kind. In this case, each of processes respectively associated with turning and milling is defined in the part program for combined machining by a specialized command, the content of a command described in a respective part program sentence is distinguished to thereby determine the kind of this part program sentence, and further a determination is made as to whether or not the program sentence indicates the program end each time the creating process of NC data for turning, milling or general purpose machining with respect to the respective program sentence is completed.

We claim:

1. An automatic programming method comprising the steps of:
    (a) creating a part program for combined machining having a plurality of blocks wherein each block includes one of part programs selected from first and second part programs respectively related to first and second kinds of machining;
    (b) providing a group of translating means which includes first and second translating means for translating the first and second part programs into first and second NC data respectively which relate to the first and second kinds of machining;
    (c) reading one of the blocks of the part program for combined machining and automatically determining a kind of the part program of the read block;
    (d) automatically translating the part program of the read block into NC data by use of the translating means whose kind corresponds to the kind of the part program of the read block; and
    (e) repeatedly reading and translating each block of the part program for combined machining into NC data according to steps (c) and (d).

2. The automatic programming method according to claim 1, wherein the first and second part programs respectively relate to turning and milling.

3. The automatic programming method according to claim 2, wherein the part program for combined machining includes a third part program which relates to neither one of turning and milling, and the third part program is automatically translated by means of a third translating means.

4. The automatic programming method according to claim 3, wherein the first and second part programs are respectively written in first and second automatic programming languages for turning and milling, and wherein the third part program is written in a third automatic programming language for general purpose machining, and wherein one of the first to third automatic programming languages in which the part program of the block read in the step (c) is written is determined, to thereby determine the kind of this part program.

5. The automatic programming method according to claim 1, wherein the group of translating means comprises a group of interpreters which includes first and second interpreters respectively serving as the first and second translating means.

6. The automatic programming method according to claim 3, wherein the third translating means comprises a third interpreter.

7. An automatic programming method comprising the steps of:
   (a) creating a part program for combined machining having a plurality of blocks wherein each block includes one of part programs selected from first, second and third part programs corresponding to first, second and third kinds of machining respectively;
   (b) providing first, second and third translating means including first, second and third interpreters respectively, for translating the first, second and third part programs into first, second and third NC data respectively, which correspond to the first, second and third kinds of machining;
   (c) reading one of the blocks of the part program for combined machining and automatically determining the kind of the part program of the read block;
   (d) automatically translating the part program of the read block into NC data by the one translating means selected from the first, second and third translating means, wherein the translating means is selected to correspond to the kind of the part program of the read block; and
   (e) repeatedly reading and translating each block of the part program for combined machining into NC data according to steps (c) and (d).

8. The automatic programming method according to claim 7, wherein the first, second and third part programs are respectively written in first, second and third automatic programming languages for turning, milling and general purpose machining.

* * * * *